(12) United States Patent
Sasaki et al.

(10) Patent No.: US 11,894,579 B2
(45) Date of Patent: Feb. 6, 2024

(54) SECONDARY BATTERY

(71) Applicant: TOYOTA JIDOSHA KABUSHIKI KAISHA, Toyota (JP)

(72) Inventors: Tatsuhiko Sasaki, Anjo (JP); Taro Matsushita, Toyokawa (JP); Kenta Watanabe, Toyota (JP); Shotaro Ishikawa, Miyoshi (JP); Koichiro Kishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 17/395,724

(22) Filed: Aug. 6, 2021

(65) Prior Publication Data
US 2022/0085472 A1 Mar. 17, 2022

(30) Foreign Application Priority Data

Sep. 11, 2020 (JP) ................... 2020-152873

(51) Int. Cl.
*H01M 50/543* (2021.01)
*H01M 50/172* (2021.01)
*H01M 50/55* (2021.01)
*H01M 50/557* (2021.01)
*H01M 50/584* (2021.01)
(Continued)

(52) U.S. Cl.
CPC ....... *H01M 50/574* (2021.01); *H01M 50/172* (2021.01); *H01M 50/477* (2021.01); *H01M 50/528* (2021.01); *H01M 50/543* (2021.01); *H01M 50/55* (2021.01); *H01M 50/557* (2021.01); *H01M 50/584* (2021.01)

(58) Field of Classification Search
CPC .. H01M 50/172; H01M 50/543; H01M 50/55; H01M 50/557
See application file for complete search history.

(56) References Cited

U.S. PATENT DOCUMENTS

2009/0280398 A1\* 11/2009 Park .................... H01M 50/119
429/100
2013/0280585 A1\* 10/2013 Morisaki ........... H01M 10/0436
429/152
(Continued)

FOREIGN PATENT DOCUMENTS

JP 2006-221931 A 8/2006
JP 2016-025014 A 2/2016
(Continued)

*Primary Examiner* — Matthew T Martin
*Assistant Examiner* — Jessie Walls-Murray
(74) *Attorney, Agent, or Firm* — Oliff PLC

(57) ABSTRACT

A secondary battery includes an electrode, a positive electrode current collector, a negative electrode current collector, a positive electrode terminal, a negative electrode terminal, and an insulating plate. The positive electrode terminal and the negative electrode terminal each have a main side surface and a sub side surface having an area smaller than that of the main side surface. The positive electrode terminal and the negative electrode terminal are arranged so that the main side surface of the positive electrode terminal and the main side surface of the negative electrode terminal face each other. The insulating plate is arranged between the main side surface of the positive electrode terminal and the main side surface of the negative electrode terminal.

3 Claims, 5 Drawing Sheets

(51) Int. Cl.
*H01M 50/477* (2021.01)
*H01M 50/574* (2021.01)
*H01M 50/528* (2021.01)

(56) References Cited

U.S. PATENT DOCUMENTS

2015/0086864 A1* 3/2015 Park .................. H01M 10/0413
429/211
2016/0268557 A1* 9/2016 Sohn .................... H01M 50/533
2021/0119303 A1* 4/2021 Xue ..................... H01M 10/058

FOREIGN PATENT DOCUMENTS

JP 2020-064754 A 4/2020
WO WO-2013187687 A1 * 12/2013 ............ H01M 10/48

* cited by examiner

SECONDARY BATTERY

This nonprovisional application is based on Japanese Patent Application No. 2020-152873 filed on Sep. 11, 2020 with the Japan Patent Office, the entire contents of which are hereby incorporated by reference.

BACKGROUND

Field

The present disclosure relates to a secondary battery.

Description of the Background Art

For example, Japanese Patent Laying-Open No. 2016-25014 discloses a film exterior battery having a flat laminate film exterior body. This film exterior battery has a pair of tabs protruding from the laminate film exterior body. One of the pair of tabs is a positive electrode tab, and the other of the pair of tabs is a negative electrode tab. Each tab extends parallel to a flat surface of the laminate film exterior body. The pair of tabs are provided at one end of the laminate film exterior body. The pair of tabs are arranged to be aligned in a direction orthogonal to a thickness direction of each tab.

SUMMARY

In the secondary battery described in Japanese Patent Laying-Open No. 2016-25014, since the positive electrode tab and the negative electrode tab are arranged to be aligned in the direction orthogonal to the thickness direction of each tab, it is necessary to increase the thickness of each tab in order to increase the cross sectional area of each tab to suppress heat generation at each tab when applying a current, while securing insulation between the tabs. That is, in the secondary battery described in Japanese Patent Laying-Open No. 2016-25014, the degree of freedom of the design of each tab is small when increasing the cross sectional area of each tab while securing insulation between the tabs.

An object of the present disclosure is to provide a battery module that can secure insulation between terminals and can also increase the degree of freedom of the design of the terminals.

A secondary battery according to one aspect of the present disclosure includes an electrode; a positive electrode current collector provided at one end of the electrode in one direction; a negative electrode current collector provided at the one end of the electrode in the one direction; a positive electrode terminal connected to the positive electrode current collector and formed in a flat plate shape; a negative electrode terminal connected to the negative electrode current collector and formed in a flat plate shape; and an insulating plate that insulates between the positive electrode terminal and the negative electrode terminal, the positive electrode terminal and the negative electrode terminal each having a main side surface and a sub side surface having an area smaller than that of the main side surface, the positive electrode terminal and the negative electrode terminal being arranged so that the main side surface of the positive electrode terminal and the main side surface of the negative electrode terminal face each other, the insulating plate being arranged between the main side surface of the positive electrode terminal and the main side surface of the negative electrode terminal.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
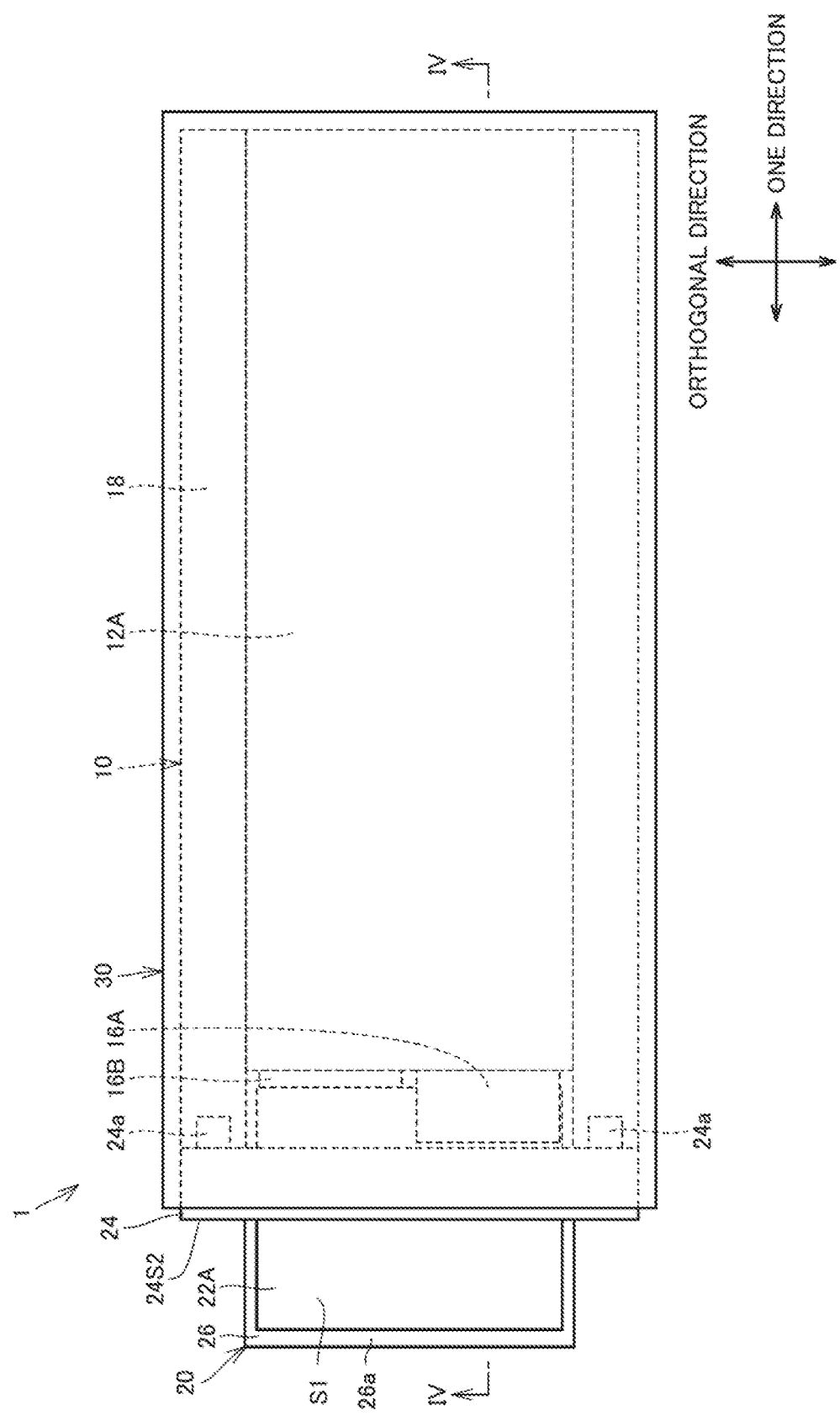
FIG. 1 is a front view schematically showing a configuration of a secondary battery in one embodiment of the present disclosure.

An embodiment of the present disclosure will be described with reference to the drawings. It should be noted that, in the drawings referred to below, identical or corresponding members will be designated by the same reference numerals.

FIG. 1 is a front view schematically showing a configuration of a secondary battery in one embodiment of the present disclosure. This secondary battery 1 is mounted, for example, on a vehicle. Examples of secondary battery 1 include a lithium ion battery.

As shown in FIG. 1, secondary battery 1 includes an electrode body unit 10, a terminal unit 20, and a laminate exterior body 30.

Electrode body unit 10 has a pair of electrodes 12A and 12B, a separator 14, a positive electrode current collector 16A, a negative electrode current collector 16B, and fixing portions 18.

Each of electrodes 12A and 12B is formed in the shape of a thin film or a thin flat plate. Each of electrodes 12A and 12B is formed in the shape of a rectangle that is long in one direction. One of the pair of electrodes is positive electrode 12A, and the other of the pair of electrodes is negative electrode 12B. Electrodes 12A and 12B are arranged to face each other in a thickness direction of the electrodes.

Figure 4:
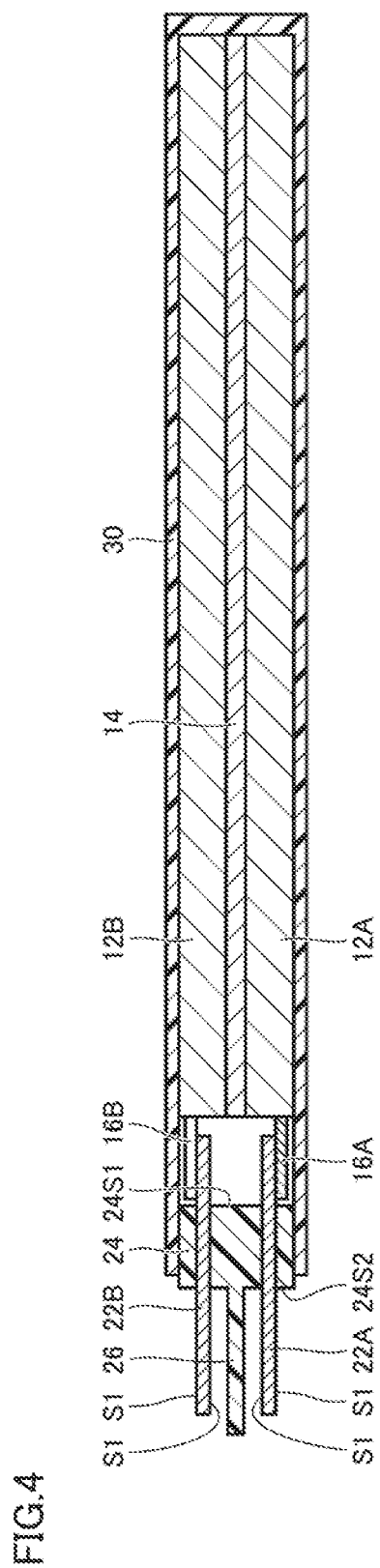
FIG. 4 is a cross sectional view taken along a line IV-IV in FIGS. 1 and 3.

As shown in FIG. 4, separator 14 is provided between the pair of electrodes 12A and 12B.

Positive electrode current collector 16A is electrically connected to positive electrode 12A. Specifically, positive electrode current collector 16A is provided at one end of positive electrode 12A in the one direction (see FIGS. 1 and 2). The length of positive electrode current collector 16A in an orthogonal direction (see FIGS. 1 and 2) orthogonal to both the one direction and the thickness direction of electrodes 12A and 12B is set to be less than half of the length of each of electrodes 12A and 12B in the orthogonal direction. Positive electrode current collector 16A is made of metallic foil.

Negative electrode current collector 16B is electrically connected to negative electrode 12B. Specifically, negative electrode current collector 16B is provided at one end of negative electrode 12B in the one direction. The length of negative electrode current collector 16B in the orthogonal direction is set to be less than half of the length of each of electrodes 12A and 12B in the orthogonal direction. Negative electrode current collector 16B is made of metallic foil.

As shown in FIG. 1, positive electrode current collector 16A and negative electrode current collector 16B are arranged at positions separated from each other in the orthogonal direction. As shown in FIG. 4, positive electrode current collector 16A and negative electrode current collector 16B are arranged at positions separated from each other in the thickness direction of electrodes 12A and 12B (direction orthogonal to both the one direction and the orthogonal direction).

Fixing portions 18 fix electrodes 12A and 12B. Fixing portions 18 fix one edge and the other edge of each of electrodes 12A and 12B in the orthogonal direction. Fixing portions 18 have a shape extending along the one direction. Fixing portions 18 are made of resin.

Each fixing portion 18 has a positioning portion 18a for positioning terminal unit 20. Positioning portion 18a is formed at an end of fixing portion 18 on one side (side where current collectors 16A and 16B are provided) in the one direction. In the present embodiment, positioning portion 18a is composed of a recess.

Terminal unit 20 is a unit attached to electrode body unit 10. Terminal unit 20 has a positive electrode terminal 22A, a negative electrode terminal 22B, a holder 24, and an insulating plate 26.

Positive electrode terminal 22A and negative electrode terminal 22B are each formed in a flat plate shape. Positive electrode terminal 22A is electrically connected to positive electrode current collector 16A. Negative electrode terminal 22B is electrically connected to negative electrode current collector 16B.

Positive electrode terminal 22A and negative electrode terminal 22B each have a main side surface S1 and a sub side surface S2. Sub side surface S2 has an area smaller than that of main side surface S1. Positive electrode terminal 22A and negative electrode terminal 22B are arranged so that main side surface S1 of positive electrode terminal 22A and main side surface S1 of negative electrode terminal 22B face each other.

Figure 2:
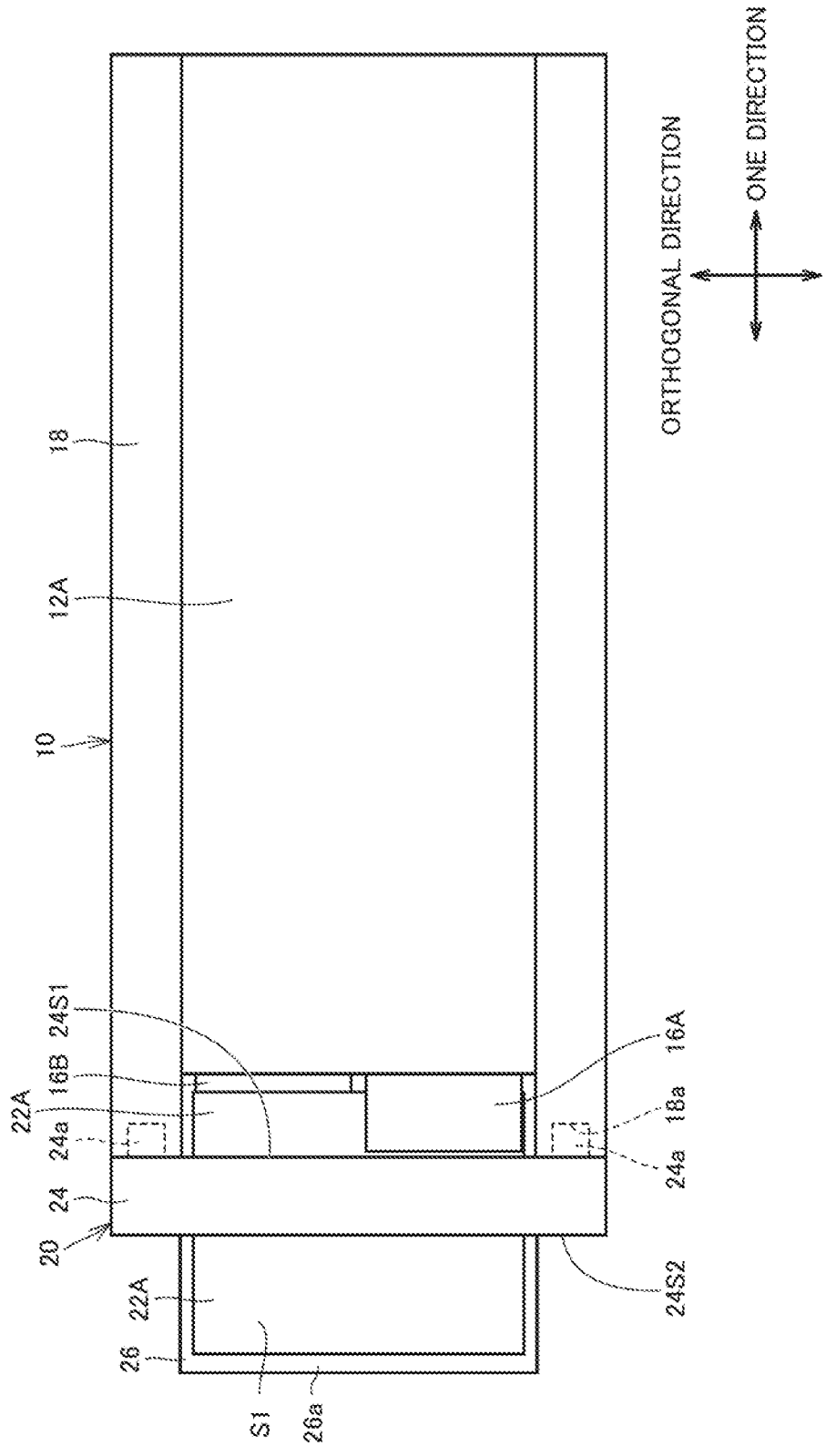
FIG. 2 is a front view showing a state where a laminate exterior body is removed from the secondary battery shown in FIG. 1.
Figure 3:
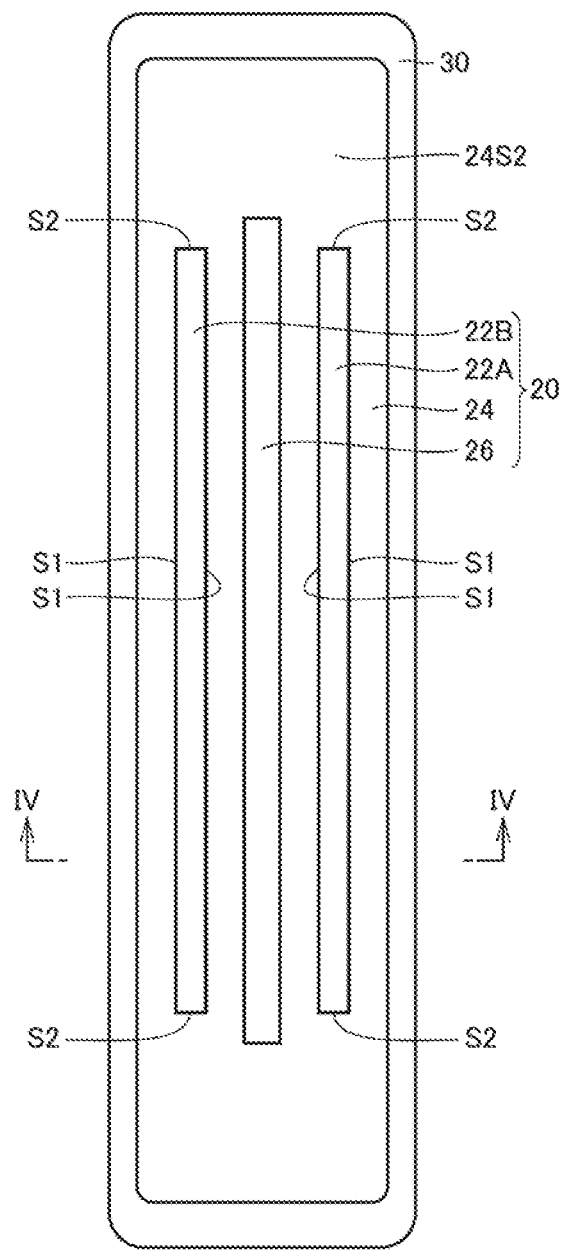
FIG. 3 is a left side view of the secondary battery.

As shown in FIG. 2, the dimension of each of terminals 22A and 22B in the orthogonal direction is larger than the dimension of each of current collectors 16A and 16B in the orthogonal direction. In the present embodiment, the dimension of each of terminals 22A and 22B in the orthogonal direction is set to be substantially the same as a distance between an outer end of positive electrode current collector 16A and an outer end of negative electrode current collector 16B in the orthogonal direction.

Holder 24 holds terminals 22A and 22B. Specifically, holder 24 holds positive electrode terminal 22A and negative electrode terminal 22B so that main side surface S1 of positive electrode terminal 22A and main side surface S1 of negative electrode terminal 22B face each other. Holder 24 holds terminals 22A and 22B in a state where terminals 22A and 22B are inserted into holder 24 in the one direction. Holder 24 is made of resin. In the present embodiment, positive electrode terminal 22A and negative electrode terminal 22B are insert-molded into holder 24.

Holder 24 has an inner surface 24S1 facing electrodes 12A and 12B, and an outer surface 24S2 opposite to inner surface 24S1. Inner surface 24S1 is flatly formed. Outer surface 24S2 is flatly formed. For example, outer surface 24S2 can be used to position secondary battery 1.

Holder 24 has attached portions 24a attached to fixing portions 18. Attached portions 24a are provided on inner surface 24S1. In the present embodiment, each attached portion 24a is composed of a projection that fits in positioning portion 18a. It should be noted that positioning portion 18a may be composed of a projection and attached portion 24a may be composed of a recess.

Insulating plate 26 insulates between positive electrode terminal 22A and negative electrode terminal 22B. Insulating plate 26 is arranged between main side surface S1 of positive electrode terminal 22A and main side surface S1 of negative electrode terminal 22B. Insulating plate 26 is connected to holder 24. Insulating plate 26 is made of resin. Preferably, insulating plate 26 is integrally molded with holder 24.

As shown in FIGS. 1 and 2, insulating plate 26 has a protruding portion 26a. Protruding portion 26a has a shape protruding from positive electrode terminal 22A and negative electrode terminal 22B when insulating plate 26 is viewed in a facing direction in which positive electrode terminal 22A and negative electrode terminal 22B face each other. That is, the outer shape of insulating plate 26 is larger than the outer shape of each of terminals 22A and 22B.

Figure 5:
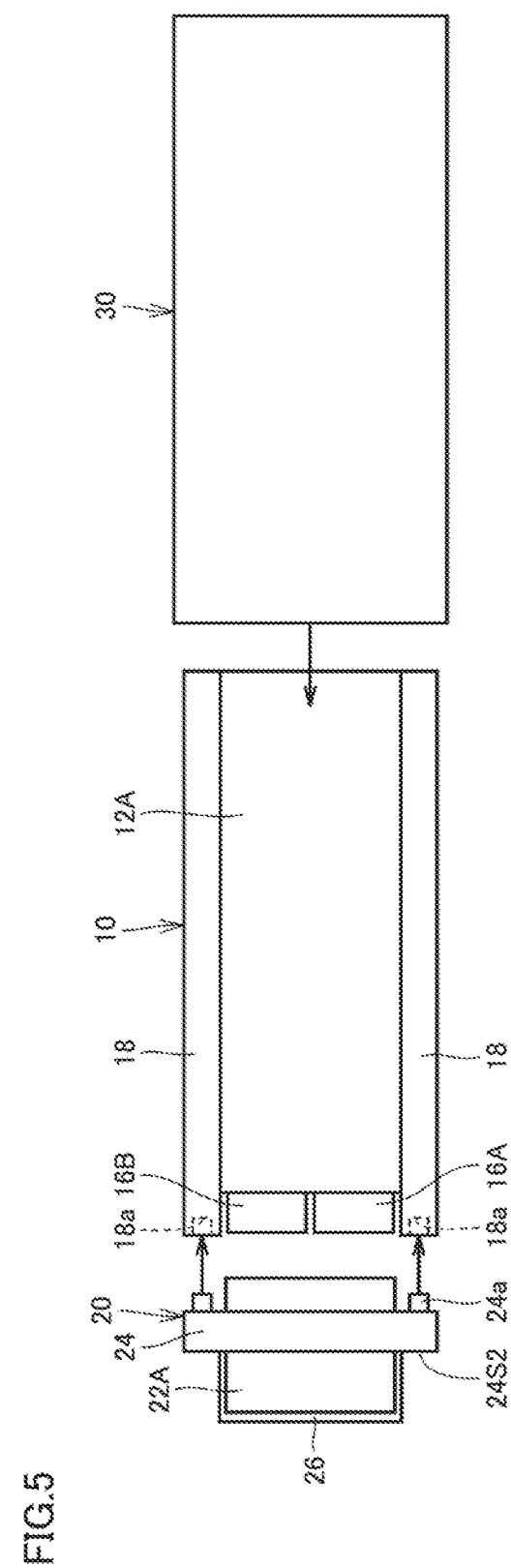
FIG. 5 is an exploded view of the secondary battery.

Laminate exterior body 30 is provided around fixing portions 18 and holder 24. As shown in FIG. 5, laminate exterior body 30 is formed by winding a resin film around fixing portions 18 and holder 24 after terminal unit 20 is connected to electrode body unit 10.

As described above, in this secondary battery 1, since insulating plate 26 is arranged between positive electrode terminal 22A and negative electrode terminal 22B, insulation between terminals 22A and 22B is secured. Further, since positive electrode terminal 22A and negative electrode terminal 22B are arranged so that main side surfaces S1 thereof face each other, the cross sectional area of each of terminals 22A and 22B can be adjusted by adjusting the area of main side surface S1. Accordingly, this secondary battery 1 can secure insulation between terminals 22A and 22B and can also increase the degree of freedom of the design of terminals 22A and 22B.

A person skilled in the art would understand that the exemplary embodiment described above is a specific example of the following aspects.

A secondary battery in the embodiment described above includes: an electrode; a positive electrode current collector provided at one end of the electrode in one direction; a negative electrode current collector provided at the one end of the electrode in the one direction; a positive electrode terminal connected to the positive electrode current collector and formed in a flat plate shape; a negative electrode terminal connected to the negative electrode current collector and formed in a flat plate shape; and an insulating plate that insulates between the positive electrode terminal and the negative electrode terminal, the positive electrode terminal and the negative electrode terminal each having a main side surface and a sub side surface having an area smaller than that of the main side surface, the positive electrode terminal and the negative electrode terminal being arranged so that the main side surface of the positive electrode terminal and the main side surface of the negative electrode terminal face each other, the insulating plate being arranged between the main side surface of the positive electrode terminal and the main side surface of the negative electrode terminal.

In this secondary battery, since the insulating plate is arranged between the positive electrode terminal and the negative electrode terminal, insulation between the terminals is secured. Further, since the positive electrode terminal and the negative electrode terminal are arranged so that the main side surfaces thereof face each other, the cross sectional area of each of the terminals can be adjusted by adjusting the area of the main side surface. Accordingly, this secondary battery can secure insulation between the terminals and can also increase the degree of freedom of the design of the terminals.

Further, since each terminal can be thinned, each terminal can have an improved weldability. Furthermore, since each terminal has a reduced flexural rigidity due to thinning, absorption of cell pitch displacement due to expansion and contraction of the electrode or the like can be improved.

In addition, preferably, the insulating plate has a protruding portion protruding from the positive electrode terminal and the negative electrode terminal when the insulating plate is viewed in a facing direction in which the positive electrode terminal and the negative electrode terminal face each other.

Such a configuration suppresses the positive electrode terminal and the negative electrode terminal from coming into contact with each other due to deformation of the terminals or the like.

In addition, preferably, the secondary battery further includes: a fixing portion that fixes the electrode; and a holder that holds the positive electrode terminal and the negative electrode terminal so that the main side surface of the positive electrode terminal and the main side surface of the negative electrode terminal face each other, wherein the insulating plate is connected to the holder, and the holder is fixed to the fixing portion.

In addition, preferably, the secondary battery further includes a laminate exterior body provided around the fixing portion and the holder.

This manner suppresses the laminate exterior body from peeling off from each terminal when an external force acts on each terminal due to expansion and contraction of the electrode or the like, as compared with a case where the laminate exterior body is welded to each terminal.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A secondary battery comprising:
    a positive electrode;
    a negative electrode;
    a positive electrode current collector provided at one end of the positive electrode in one direction;
    a negative electrode current collector provided at one end of the negative electrode in the one direction;
    a positive electrode terminal connected to the positive electrode current collector and formed in a flat plate shape;
    a negative electrode terminal connected to the negative electrode current collector and formed in a flat plate shape;
    a laminate exterior body provided around the positive electrode, the negative electrode, the positive electrode current collector, and the negative electrode current collector;
    an insulating plate that insulates between the positive electrode terminal and the negative electrode terminal,
        the positive electrode terminal and the negative electrode terminal each having a protruding portion protruding from the laminate exterior body in the one direction, each protruding portion having a main side surface and a sub side surface having an area smaller than that of the main side surface,
        the positive electrode terminal and the negative electrode terminal being arranged so that the main side surface of the protruding portion of the positive electrode terminal and the main side surface of the protruding portion of the negative electrode terminal face each other,
        the insulating plate being arranged between the main side surface of the protruding portion of the positive electrode terminal and the main side surface of the protruding portion of the negative electrode terminal;
    a fixing portion that fixes the positive and negative electrodes; and
    a holder that holds the positive electrode terminal and the negative electrode terminal so that the main side surface of the protruding portion of the positive electrode terminal and the main side surface of the protruding portion of the negative electrode terminal face each other, wherein:
    the insulating plate is connected to the holder, and
    the holder is fixed to the fixing portion.

2. The secondary battery according to claim 1, wherein the insulating plate has a protruding portion protruding from the positive electrode terminal and the negative electrode terminal when the insulating plate is viewed in a facing direction in which the positive electrode terminal and the negative electrode terminal face each other.

3. The secondary battery according to claim 1, wherein the laminate exterior body is provided around the fixing portion and the holder.

* * * * *